United States Patent [19]
Karasan et al.

[11] Patent Number: 5,878,177
[45] Date of Patent: Mar. 2, 1999

[54] LAYERED SWITCH ARCHITECTURES FOR HIGH-CAPACITY OPTICAL TRANSPORT NETWORKS

[75] Inventors: Ezhan Karasan; Lih-Yuan Lin, both of Middletown; Robert William Tkach, Little Silver, all of N.J.

[73] Assignee: AT&T Corp., Middletown, N.J.

[21] Appl. No.: 918,192

[22] Filed: Aug. 21, 1997

Related U.S. Application Data

[60] Provisional application No. 60/042,272 Mar. 31, 1997.
[51] Int. Cl.⁶ ..................................................... G02B 6/26
[52] U.S. Cl. .............................................................. 385/17
[58] Field of Search .............................. 385/15–23, 147; 455/4.2, 5.1, 6.2

[56] References Cited

U.S. PATENT DOCUMENTS

| | | | |
|---|---|---|---|
| 5,491,696 | 2/1996 | Nishimura | 370/225 |
| 5,557,317 | 9/1996 | Nishio et al. | 348/7 |
| 5,805,682 | 9/1998 | Voit et al. | 455/4.2 |

OTHER PUBLICATIONS

*Performances of an Optical Path Cross–Connect System and its Wavelength Monitoring Circuit*, Masafumi Koga et al., 1995 IEEE International Conference and Communications, pp. 1771–1777, vol. 3, 1996.
*An Optical Infrastructure for Future Telecommunications Networks*, Derr et al., IEEE Communications Magazine, Nov. 1995., pp. 84–88, vol. 33, No. 11.
*Concepts for an Optical WDM Transport Network and Experimental Results*, Eilenberger et al., International Switching Symposium '95, pp. 377–381, vol. 2, Apr. 1995.
*High Capacity Photonic Switching System*, T. Sawano et al., International Switching Symposium '92, pp. 357–361, vol. 2, Oct. 1992.
*Comparison of Wavelength–Interchanging and Wavelength–Selective Cross–Connects in Multiwavelength All–Optical Networks*, G. Jeong, E. Ayanoglu, Proceedings of the 1996 15th Annual Joint Conference of the IEEE Computer and Communications Societies, INFOCOM '96. Part 1 (of 3), 1996.
Richard E. Wagner et al., *MONET: Multiwavelength Optical Networking*, Journal of Lightwave Technology, vol. 14, No. 6, Jun. 1996.
Richard A. Barry et al., *Models of Blocking Probability in All–Optical Network with and Without Wavelength Changers*, IEEE Journal on Selected Areas in Communications, vol. 14, No. 5, Jun. 1996.
Edmond J. Murphy et al., *16×16 Strictly Nonblocking Guided– Wave Optical Switching System*, Journal of Lightwave Technology, vol. 14, No. 3, Mar. 1996.
Gibong Jeong et al., *Comparison of Wavelength–Interchanging and Wavelength–Selective Cross–Connects in Multiwavelength All–Optical Networks*, IEEE INFOCOM '96, Proceedings vol. 1, Mar. 24–28, 1996.

*Primary Examiner*—Akm E. Ullah

[57] ABSTRACT

A layered optical cross-connect switches signals from a first set of optical fibers to a second set of optical fibers. The optical cross-connect comprises at least two switching layers. The input ports and the output ports of each switching layer are fully interconnected. At least one switching layer is configured to switch at least two signals from the same optical fiber from the first set of optical fibers to the second set of optical fibers. For example, in a wavelength-division multiplex (WDM) system, a switching layer can switch signals from different WDM channels having different wavelengths.

23 Claims, 9 Drawing Sheets

LAYERED SWITCH ARCHITECTURES FOR HIGH-CAPACITY OPTICAL TRANSPORT NETWORKS

CROSS-REFERENCES TO RELATED APPLICATIONS

This application claims the benefit of U.S. Provisional Application Ser. No. 60/042,272, filed Mar. 31, 1997.

FIELD OF THE INVENTION

The present invention relates to a layered switch architecture for high-capacity optical communications networks.

BACKGROUND

The long-distance optical transport network with wavelength-division multiplexing (WDM) technology has shown a promising future for high-capacity optical fiber communications. In such a network, the communications between central offices within a telecommunications network are conveyed by a fiber-trunk mesh. Each central office acts as a network node, where signals from different fiber trunks and local client offices are either switched to different output fiber trunks for transmission to the next node, or dropped to the local offices.

The Wavelength Selective Cross-Connect (WSXC) is one type of known optical cross-connect. WSXC accepts multiwavelength signals and cross-connects individual wavelengths. Received signals are wavelength demultiplexed and then the signals having the same wavelength are switched on a wavelength-specific switching layer. In a WDM system, each WDM channel will be associated with a unique WSXC switching layer. At a network node connecting P fibers each having Q wavelength channels, the WSXC will have Q P-by-P switching layers. WSXC is nonblocking in any wavelength-specific layer, but is blocking from one wavelength layer to another. In other words, a signal received on any input port for a given wavelength-specific layer can be switched to any output port for that layer. A signal received on an output port of a given wavelength-specific layer, however, cannot be switched to an output port of a different wavelength-specific layer.

Another type of known optical cross-connect is the Wavelength Interchanging Cross-Connect (WIXC). WIXC accepts multiwavelength signals and cross-connects signals with wavelength interchange when necessary. In other words, at a network node connecting P fibers each having Q wavelength channels, the WIXC will have a single PQ-by-PQ switching layer. WIXC is nonblocking between fibers and between wavelength layers.

With network traffic demand rapidly growing, there is a growing demand for increased capacity in a telecommunications network. A likely solution to increase the capacity of a telecommunications network is to increase the number of wavelengths in WDM systems and/or to increase the quantities of fibers in each fiber trunk. This solution requires the high-capacity switch fabrics at the central offices to handle an increased number of input/output ports. Consequently, an optimum switch architecture should have a manageable switch size and have high expandability.

Known optical cross-connects, however, cannot adequately address the increased capacity requirements of telecommunications networks having rapidly growing traffic. Known optical cross-connects must increase the number of ports in the switch layers as the number of wavelengths and/or the quantities of fibers in each fiber trunk increases. Specifically, in the WSXC, the number of ports in each switching layer must be increased as the quantity of fibers in each fiber trunk increases. Similarly, in the WIXC, the number of ports in the single switching layer must be increased as either the number of wavelengths or the quantities of fibers in each fiber trunk increases. At some point, cost and/or available technology prohibits adding more ports to a switching layer to expand the capacity of known optical cross-connects. Consequently, known optical cross-connects have limited expandability and create management problems as capacity requirements increase.

SUMMARY OF THE INVENTION

To avoid the formidable number of switch points that a fully connected switch fabric requires, layered switch architectures of the present invention take advantage of a particular feature of any large fiber network: the nodes of the network have many signals incident on them but have relatively small numbers of routes into them. Thus, a signal arriving at the node does not need full access to every signal path; rather, it needs access to any route leaving the node. Therefore, good performance in terms of blocking of connections can still be achieved even though the switch fabrics are not fully connected.

Unlike the wavelength-selective cross-connect (WSXC) architecture, the present invention considers the layering as a desirable feature in itself, unrelated to the number of wavelengths used for transmission. In addition to greatly reduced switch size, the present invention also possesses high design flexibility, high expandability and low blocking probability because of the wavelength-independence.

The optical cross-connect has a layered switch fabric and switches signals from incoming optical fibers to outgoing optical fibers. The layered switch fabric can be divided into multiple switching layers. Each switching layer has its own input ports coupled to at least a portion of the incoming optical fibers. Each switching layer also has its own output ports coupled to at least a portion of the outgoing optical fibers. The input ports and the output ports of each switching layer are fully interconnected.

At least one switching layer is configured to switch at least two signals from the same optical fiber from the incoming optical fibers to the outgoing optical fibers. For example, the two signals can correspond to separate WDM channels.

In an alternative embodiment, at least one switching layer of the optical cross-connect can be configured to switch at least two signals having different wavelengths carried by the incoming optical fibers. In other words, the two signals can correspond to separate WDM channels on the same or on separate incoming optical fibers.

The optical cross-connect can include wavelength demultiplexers and regenerators interposed between the incoming optical fibers and the switching layers. The optical cross-connect can also include wavelength multiplexers and regenerators interposed between the outgoing optical fibers and the switching layers. Alternatively, optical wavelength converters can be substituted for the regenerators.

In an alternative embodiment, the optical cross-connect can include two stages of switching layers. The two stages can be orthogonally layered within the same network node.

In an alternative embodiment, the optical cross-connect comprises at least two switching layers where each switching layer has its own input ports coupled to an input transponder bank having input transponders. Each switching layer also has its own output ports coupled to a output transponder bank having output transponders. For an $i^{th}$ switching layer of the optical cross-connect, each output port is coupled to a $i^{th}$ output transponder from the output transponder banks. For the $i^{th}$ switching layer of the optical cross-connect, each input port is coupled to the input transponders of an $i^{th}$ input transponder bank.

In an alternative embodiment, a communications network comprises two non-fully-connected optical cross-connects. Each optical cross-connect has multiple switching layers each having its own input ports and its own output ports. A first output port of a first switching layer from the first optical cross-connect is coupled to a first input port of a first switching layer from the second optical cross-connect. A second output port of the first switching layer from the first optical cross-connect is coupled to a first input port of a second switching layer from the second optical cross-connect.

DETAILED DESCRIPTION

Figure 1:
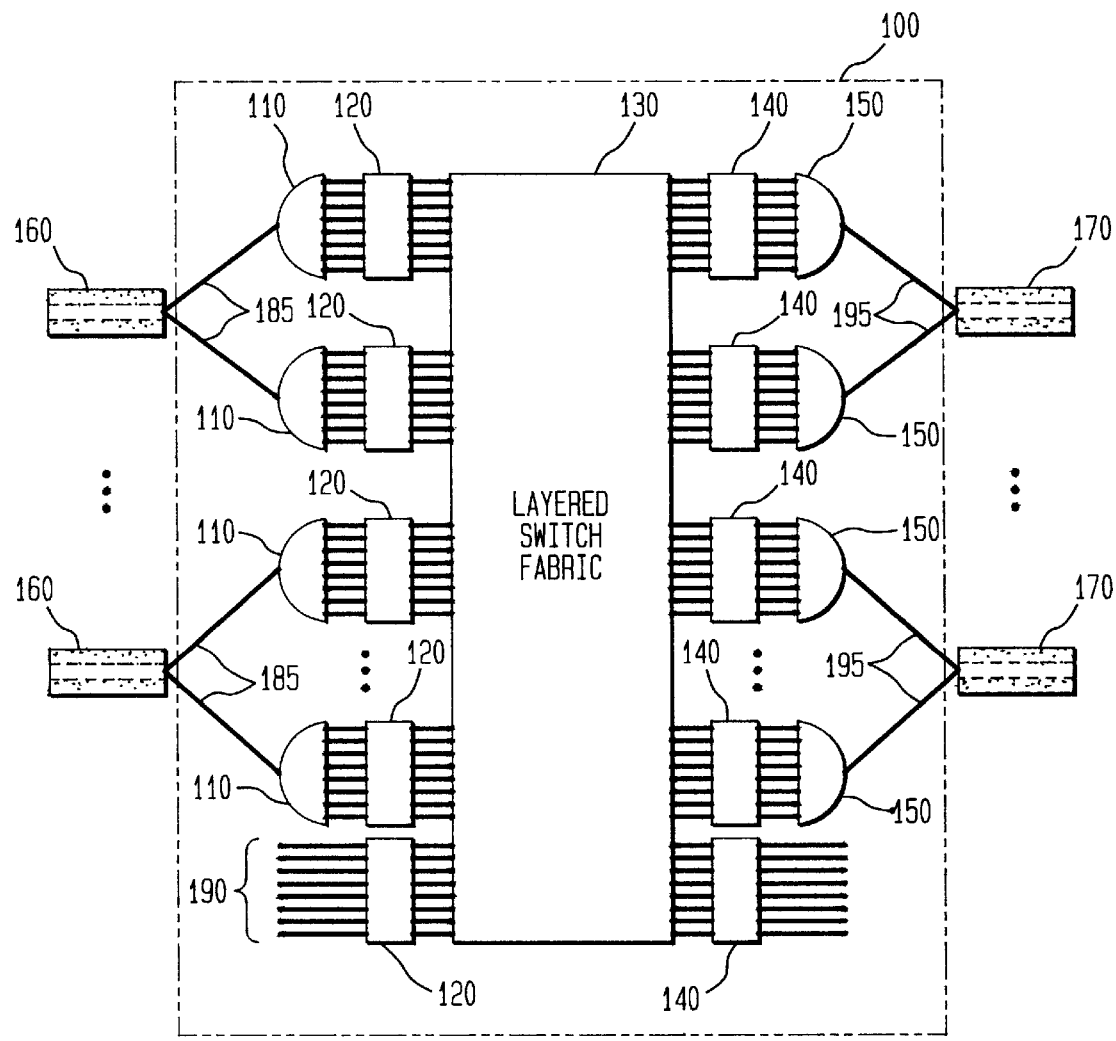
FIG. 1 shows an optical cross-connect having a layered switch fabric, according to an embodiment of the present invention.

FIG. 1 shows an optical cross-connect having a layered switch fabric, according to an embodiment of the present invention. Optical cross-connect 100 comprises a set of wavelength demultiplexers 110 connected in parallel to a set of wavelength converters 120 which are connected to layered switch fabric 130. Layered switch fabric 130 is, in turn, connected to a set of wavelength converters 140, which are connected to a set of wavelength multiplexers 150. Optical cross-connect 100 is connected to a set of fiber trunks 160 and connected to a set of fiber trunks 170. Each fiber trunk 160 includes a series of optical fibers 165 and each fiber trunk 170 includes a series of optical fibers 175. Each optical fiber 165 in fiber trunk 160 is connected to one wavelength demultiplexer 110; each optical fiber 175 in fiber trunk 170 is connected to one wavelength multiplexer 150. Optical cross-connect 100 includes a client interface 190 which allows optical fibers to directly connect to the layered switch fabric 130 without wavelength demultiplexers 110 or wavelength multiplexers 150.

As shown in FIG. 1, data traffic enters optical cross-connect 100 on fiber trunks 160 and exits optical cross-connect 100 on fiber trunks 170. Note that wavelength demultiplexers 110 and wavelength multiplexers 150 as shown in FIG. 1 are appropriate for a WDM communications system. Each wavelength demultiplexer 110 separates the WDM channels received on the connected optical fiber 160 and routes the signals associated with each WDM channel to the connected wavelength converter 120. Similarly, each wavelength multiplexer 150 combines the signals associated with the WDM channels received from the connected wavelength converter 140 and routes the combined WDM channels to the connected optical fiber 710.

In a non-WDM communication system, such as a time division multiplexing (TDM) system, time demultiplexers and time multiplexers would be appropriate rather than wavelength demultiplexers and wavelength multiplexers, respectively.

Wavelength converters 120 and 140 allow layered switch fabric 130 to switch received signals independent of the received signals' wavelength by converting all received signals to a standard wavelength. Wavelength converters 120 and 140 can be, for example, optical/electronic/optical (O/E/O) regenerators that convert the multiwavelength signals to a standard wavelength at layered switch fabric 130. Alternatively, the wavelength converters can be all optical wavelength converters.

In other words, in a WDM system, each optical fiber carries multiple signals channelized into discrete wavelengths. In such a system, wavelength converters 120 can convert the WDM channel wavelengths into a common wavelength for switching in layered switch fabric 130; similarly, wavelength converters 140 can convert the common wavelength used at layered switch fabric 130 to the WDM channel wavelengths for transport on fiber trunks 170.

Wavelength converters 120 can be eliminated if wavelength conversion and/or signal regeneration before switching and wavelength uniformity at layered switch fabric 130 are not required. The flexibility of an arbitrarily layering switch fabric, such as layered switch fabric 130, is still retained if variable-in/fixed-out wavelength conversion is utilized after switching. Similarly, in a non-WDM system where the signals are carried on the same wavelength, wavelength converters 120 and 140 would not be necessary.

Layered switch fabric 130 includes at least two switching layers. Layered switch fabric 130 is layered in the sense that the switch fabric is divided into multiple switching layers where the input ports of each switching layer are fully connected to the output ports of that switching layer. The switching layers, however, are not interconnected.

Figure 2:
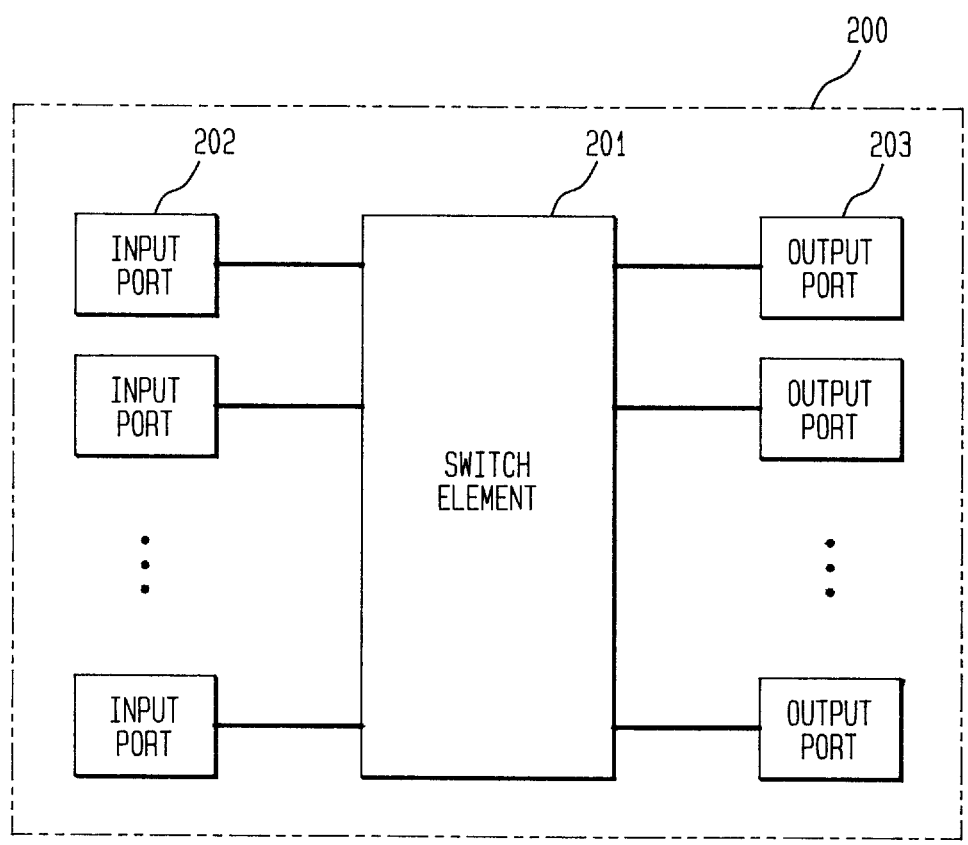
FIG. 2 illustrates a system block diagram of one switching layer from an optical cross-connect having a single-stage layered switch fabric, according to an embodiment of the present invention.

FIG. 2 illustrates a system block diagram of one switching layer from an optical cross-connect having a single-stage layered switch fabric, according to an embodiment of the present invention. The layered switch fabric has a single stage in the sense that each switching layer is coupled to the incoming and outgoing fiber trunks without any interposed switch layers.

Switching layer 200 includes switch element 201 which is connected to a set of input ports 202 and a set of output ports 203.

Switch element 201 can be any type of photonic switch which allows signals received on one input port 202 to be switched to a different output port 203. Switch element 201 can comprise any type of switch technology such as a fabric of conventional mechanical, electro-optic, thermo-optic, acousto-optic, liquid crystal, semiconductor optical amplifier, and/or microelectro-mechanical switches. Switch element 201 can comprise a single monolithic switch or can comprise a combination of multiple switches.

Switch element 201 for each switching layer 200 fully connects each input port 202 to each output port 203. The layered switch fabric includes at least one other switching layer (not shown) that fully connects each of its input ports to each of its output ports. Switching layer 200, however, is not connected to the other switching layer(s) (not shown). Due to the wavelength converters, demultiplexers and multiplexers (not shown in FIG. 2), switching layer 200 and the other switching layer(s) can operate independent of wavelength and can perform switching for signals of different wavelengths. For example, in a WDM system, switching layer 200 need not be specific to a particular wavelength, but can switch any type of WDM channel received on switching layer 200.

Note that the number of input ports 202 and output ports 203 for switching layer 200 need not equal the number of input ports and output ports on the other switching layer(s) (not shown). Note also that the number of switching layers can differ from the number of WDM channels used in the communications network.

Figure 3:
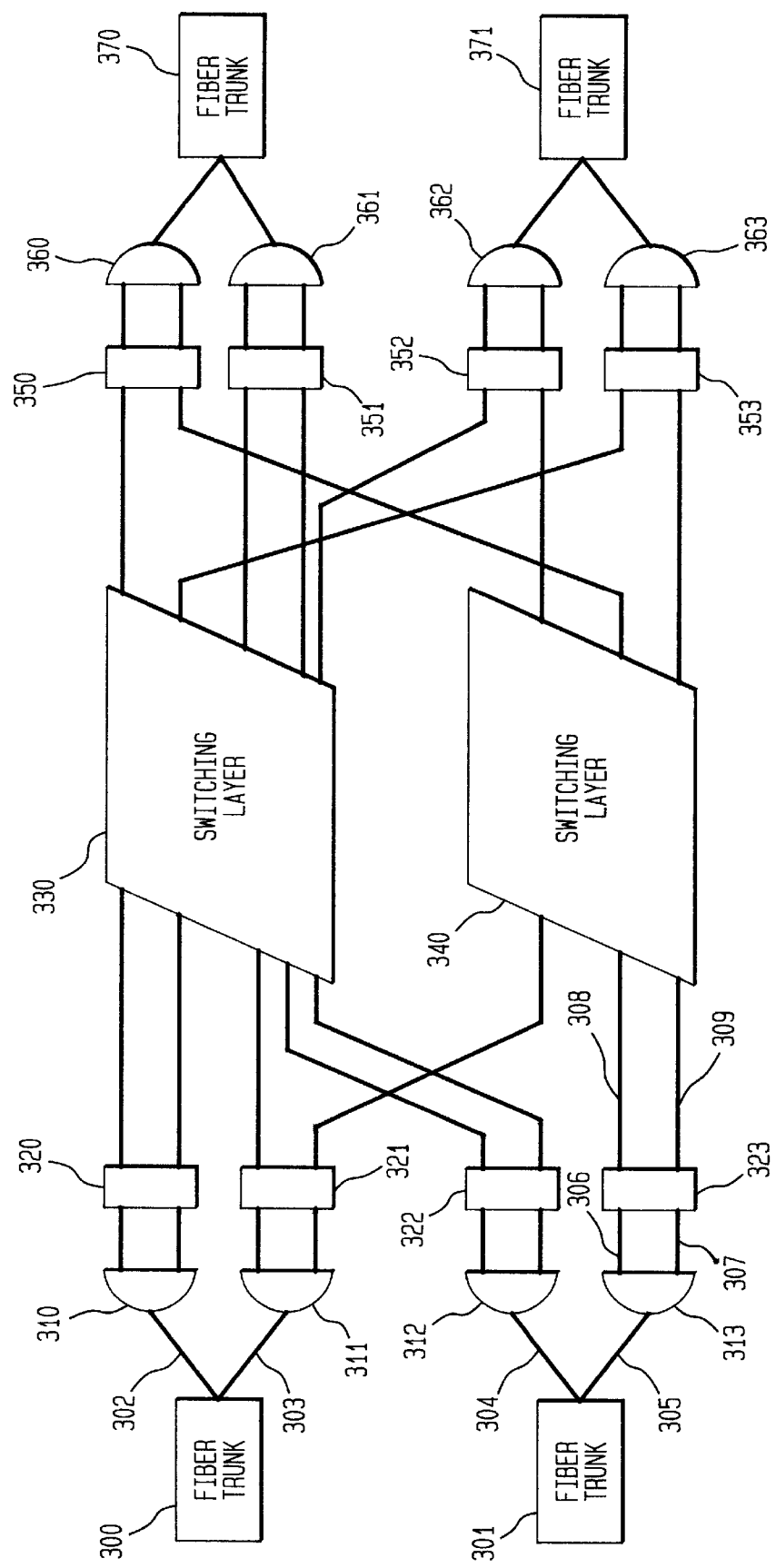
FIG. 3 illustrates an example of an optical cross-connect having two switching layers in a single-stage switching fabric, according to an embodiment of the present invention.

FIG. 3 illustrates an example of an optical cross-connect having two switching layers in a single-stage switching fabric, according to an embodiment of the present invention. FIG. 3 illustrates an extremely simple case for illustrative purposes only; in practical implementations, the optical cross-connect will likely have more than two switching layers and will be connected to more than two receiving and two transmitting fiber trunks each having more than two optical fibers.

The optical cross-connect shown in FIG. 3 is connected to two fiber trunks 300 and 301. Fiber trunk 300 includes two optical fibers 302 and 303; fiber trunk 301 includes two optical fibers 304 and 305. Optical fibers 302, 303, 304 and 305 are connected to wavelength demultiplexers 310, 311, 312 and 313, respectively. Wavelength demultiplexers 310, 311, 312 and 313 are connected to optional wavelength converters 320, 321, 322 and 323, respectively.

Wavelength converters 320, 321, 322 and 323 are connected to switching layer 330 and/or switching layer 340. More specifically, as shown in FIG. 3, wavelength converter 320 is connected to switching layer 330; wavelength converter 321 is connected to both switching layers 330 and 340; wavelength converter 322 is connected to only switching layer 330; wavelength converter 323 is connected to only switching layer 340.

In a specific example, wavelength demultiplexer 313 demultiplexes signals from optical fiber 305 on to optical fibers 306 and 307 which are connected to optional wavelength converter 323. Wavelength converter 323 wavelength converts and couples the signals from optical fibers 306 and 307 to optical fibers 308 and 309, respectively. Optical fibers 308 and 309 are connected to switching layer 340.

Switching layer 330 is connected to wavelength converters 350, 351, 352 and 353. Switching layer 340 is connected to wavelength converters 352, 353 and 350. More specifically, wavelength converter 350 is connected to switching layers 330 and 340; wavelength converter 351 is connected to switching layer 330; wavelength converter 352 is connected to switching layers 330 and 340; wavelength converter 353 is connected to switching layers 330 and 340. Wavelength converters 350, 351, 352 and 353 are connected to wavelength multiplexers 360, 361, 362 and 363, respectively. Wavelength converters 360 and 361 are connected to fiber trunk 370. Wavelength converters 362 and 363 are connected to fiber trunk 371.

FIG. 3 illustrates a case where the number of utilized input ports and output ports for each switching layer differs. More specifically, switching layer 330 has five utilized input and output ports while switching layer 340 has three utilized input and output ports.

Note that switching layers 330 and 340 are each individually connected fully, but are not connected to each other. Consequently, the optical cross-connect shown in FIG. 3 is not fully connected and can experience some minor level of partial blocking. Partial blocking can occur, for example, when the signal from optical fiber 309 cannot access fiber trunk 370 because the only path connecting switching layer 340 and fiber trunk 370 is used by the signal from optical fiber 308. Consequently, the signal from optical fiber 309 is blocked from being connected to the desired fiber trunk. Such a case demonstrates one particular example of partial blocking for the layered optical cross-connect shown in FIG. 3.

Figure 4:
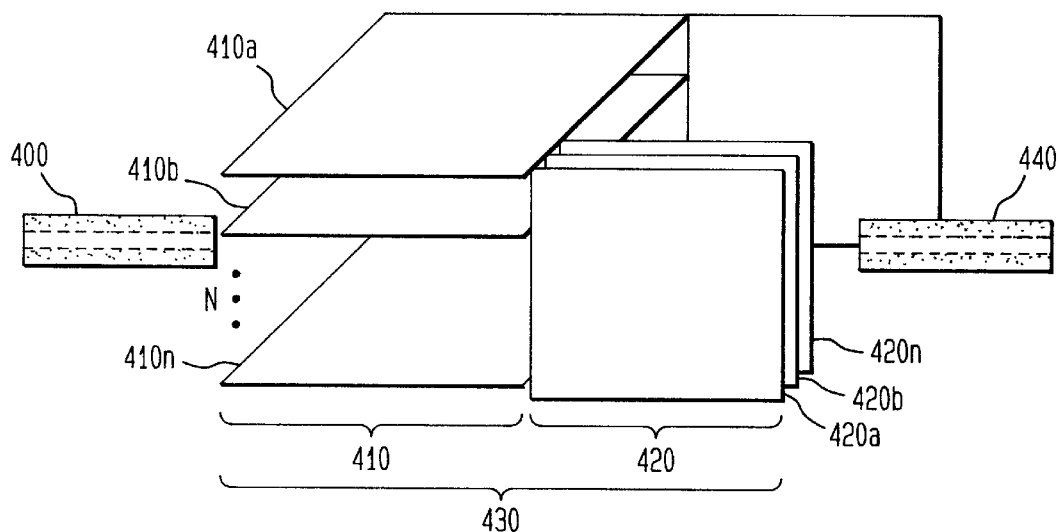
FIG. 4 shows an optical cross-connect having a two-stage layered switch fabric where switches with orthogonal layering are cascaded in the same network node, according to an embodiment of the present invention.

FIG. 4 shows an optical cross-connect having a two-stage layered switch fabric where switches with orthogonal layering are cascaded in the same network node, according to an embodiment of the present invention. The layered switch fabric has two stages in the sense that the layered switch fabric has two sets of switching layers where one set is coupled to the incoming fiber trunks without any interposed switching layers and the other set of switching layers is coupled to outgoing fiber trunks without any interposed switching layers.

Fiber trunk 400 is connected to first stage 410 of layered switch fabric 430. First stage 410 of layer switch fabric 430 comprises a set of at least two switching layers 410a through 410n; each switching layer of first stage 410 fully connects the input ports (not shown) of that switching layer to output ports (not shown) of that switching layer, but is not connected to the other switching layers of first stage 410.

Fiber trunk 440 is connected to second stage 420 of layered switch fabric 430. Similar to first stage 410, second stage 420 of layer switch fabric 430 comprises a set of at least two switching layers 420a through 420n; each switching layer of second stage 420 fully connects the input ports (not shown) of that switching layer to the output ports (not shown) of that switching layer, but is not connected to the other switching layers of second stage 420.

First stage 410 is orthogonally connected to second stage 420 of layer switch fabric 430. In other words, one output port of each switching layer of first stage 410 is coupled to one input port of each switching layer of second stage 420. This arrangement allows switching a signal on any switching layer of first stage 410 to any switching layer of second stage 420. The second stage of switching layers reduces the blocking otherwise resulting from an optical cross-connect having a single-stage switching fabric.

Figure 5:
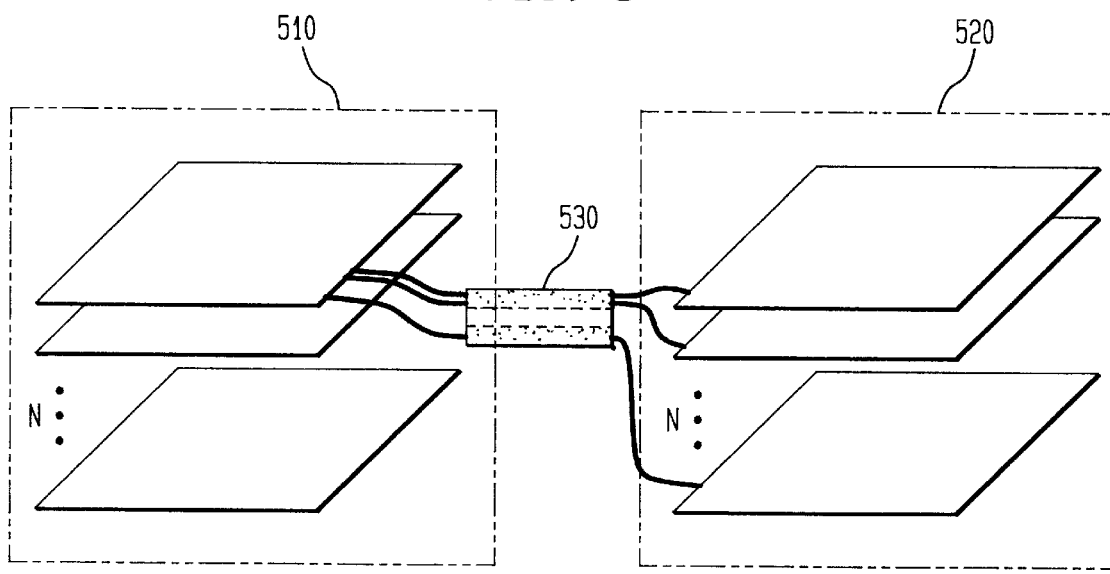
FIG. 5 shows the interconnection of two optical cross-connects each having a single-stage layered switch architecture, according to an embodiment of the present invention.

FIG. 5 shows the interconnection of two optical cross-connects each having a single-stage layered switch architecture, according to an embodiment of the present invention. In FIG. 5, optical cross-connect 510 located at one network node is connected to optical cross-connect 520 located at another network node by fiber trunk 530.

Each switch fabric of optical cross-connects 510 and 520 is separated evenly into N layers. Because each switching layer of each switch fabric operates independently of the wavelength, communication between different switching layers is achieved with an orthogonal arrangement of the switch fabrics between adjacent network nodes. Consequently, this orthogonal arrangement between adjacent network nodes reduces the blocking probability.

Physically, this orthogonal arrangement is accomplished by cross-connecting different switching layers between the network nodes along the transport path (including fiber trunk 530). Unlike the known WSXC architecture, the number of layers within each optical cross-connect shown in FIG. 5 does not depend on the number of wavelengths used for transmission. Because any number of switching layers can be used independent of the number of wavelengths, high design flexibility can be realized. Furthermore, the switch fabric is readily expandable by inserting more switch layers upon increased demand for network capacity.

Figure 6A:
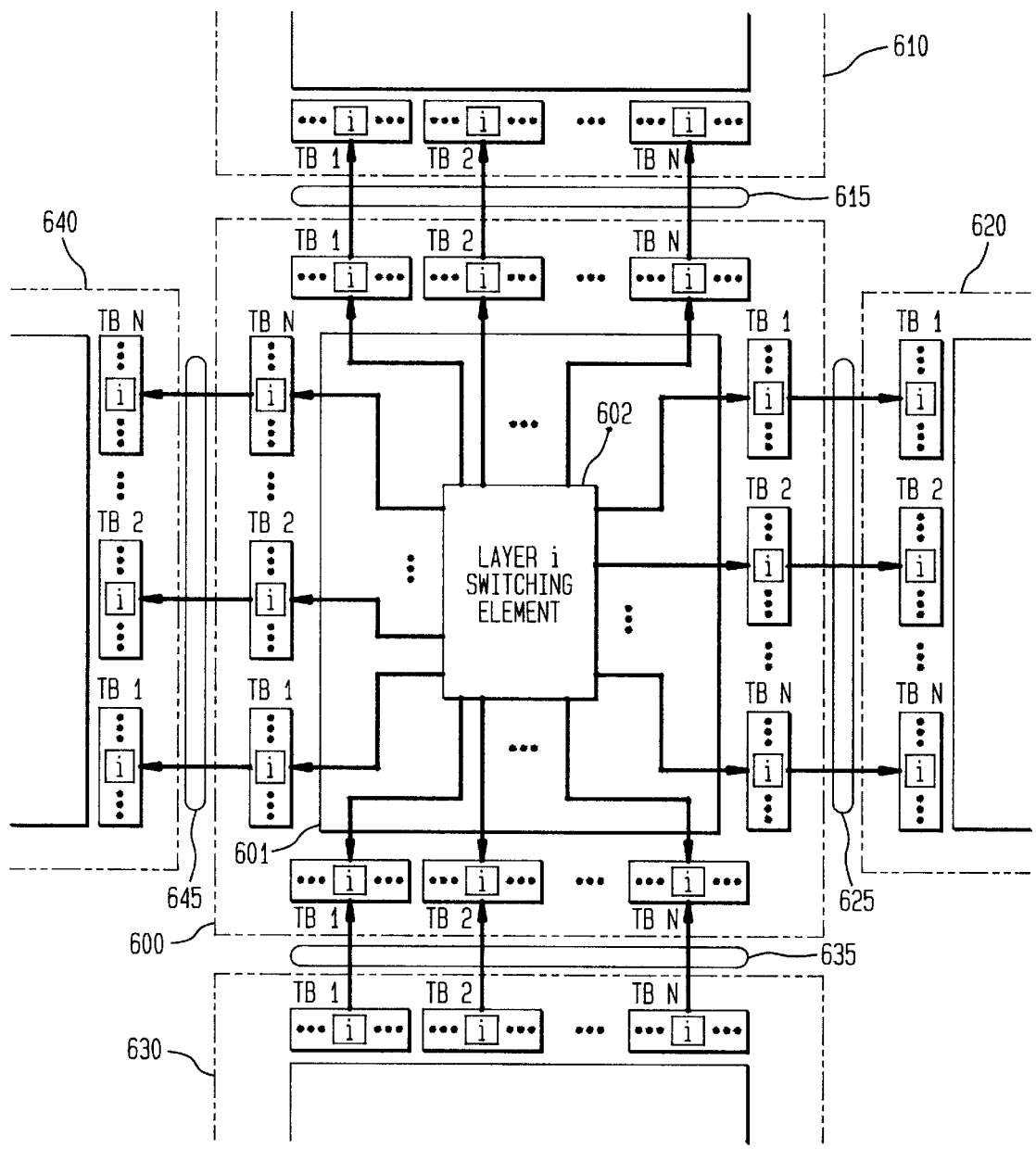
FIGS. 6A and 6B show the interconnection of optical cross-connects each having a single-stage layered switch architecture, according to another embodiment of the present invention.
Figure 6B:
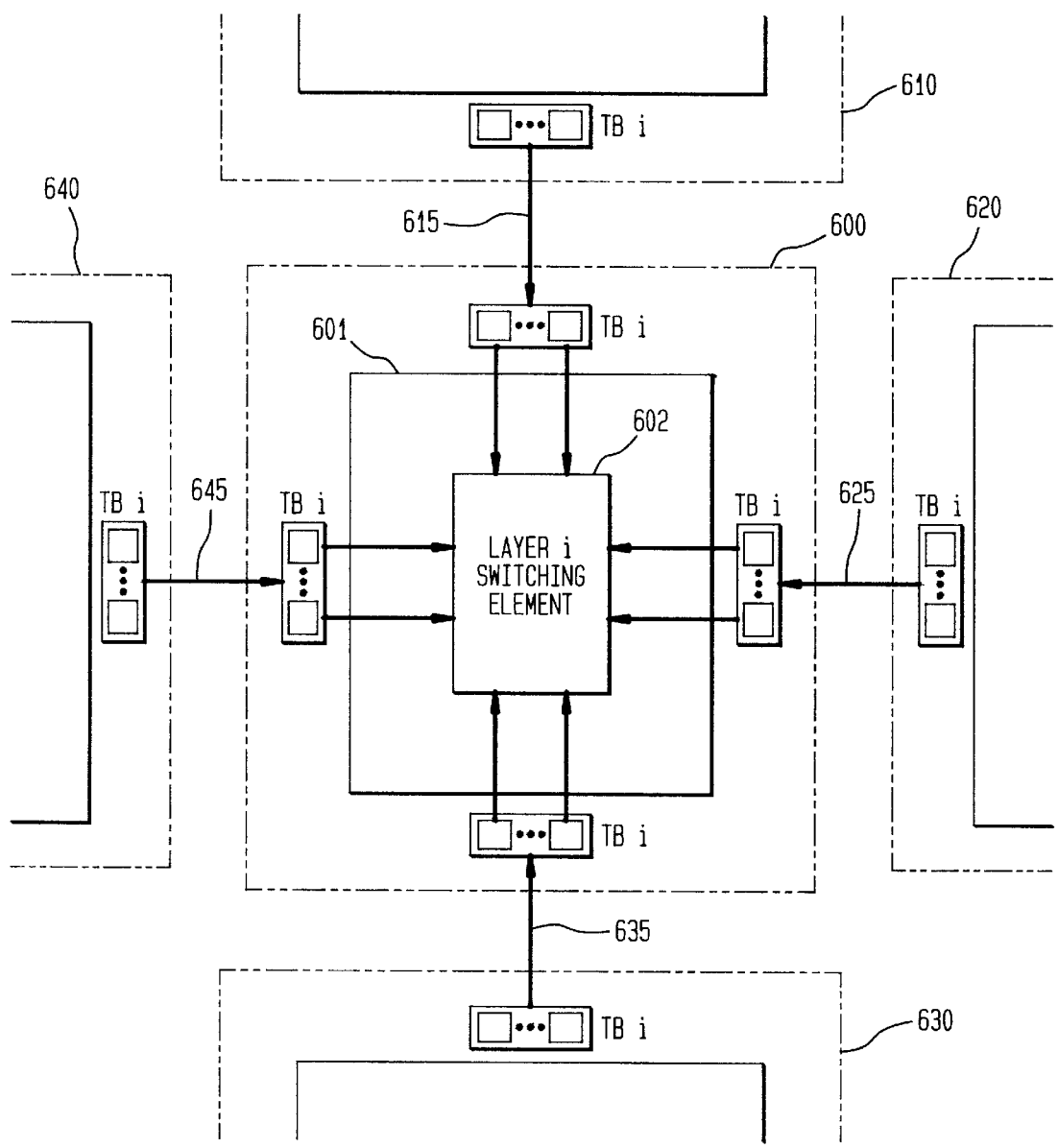

FIGS. 6A and 6B show the interconnection of optical cross-connects each having a single-stage layered switch architecture, according to another embodiment of the present invention. FIG. 6A shows the interconnections from the output side of a central optical cross-connect; FIG. 6B shows the interconnections from the input side of a central optical cross-connect.

FIGS. 6A and 6B assume that an equal number, N, of switching layers exist at each optical cross-connect at a network node. FIGS. 6A and 6B also assume that each switching layer of each optical cross-connect has an equal number, N, of input ports and of output ports.

In reference to FIGS. 6A and 6B, the wavelength demultiplexers/multiplexers and wavelength converters connecting the fiber trunk (not shown) to each switching layer are represented by a transponder bank (TB). In other words, the wavelength demultiplexers/multiplexers and wavelength converters connected to switching layer i are represented by $Tb_i$. The number of transponders in each transponder bank has N number of input ports and N number of output ports at each switching layer.

FIG. 6A shows the output side of a single switching layer 601, the $i^{th}$ switching layer, for optical cross-connect 600. Optical cross-connect 600 is connected to optical cross-connects 610, 620, 630 and 640 on network links 615, 625, 635 and 645, respectively. Switching layer 601 includes switching element 602 and four sets of input and output ports (not shown).

The interconnection of optical cross-connects can be realized at the output side of each optical cross-connect. The output ports for each switching layer i of a given optical cross-connect are connected to the $i^{th}$ transponder on all transponder banks within that optical cross-connect. In other words, $j^{th}$ output port of switching layer i which is continuing on a given network link is connected to the $i^{th}$ transponder in the $j^{th}$ transponder bank associated with the $j^{th}$ switching layer for that network link.

FIG. 6A illustrates an example of the configuration for the $i^{th}$ switching layer: the output ports for the $i^{th}$ switching layer 601 which is continuing on network link 615 are connected to the $i^{th}$ transponder of all transponder banks associated with network link 615 for optical cross-connect 600. Network link 615 connects the $i^{th}$ transponder of the $j^{th}$ transponder bank in optical cross-connect 600 to the $i^{th}$ transponder of the $j^{th}$ transponder bank in optical cross-connect 610. In a similar manner, optical cross-connect 600 is connected to optical cross-connects 620, 630 and 640 over network links 625, 635 and 645, respectively.

FIG. 6B shows the input side of a single switching layer 601, the $i^{th}$ switching layer, for optical cross-connect 600. Each transponder in all transponder banks associated with a given switching layer are connected to the input ports of that switching layer. In other words, all transponders in the transponder bank associated with, for example, the third switching layer are connected to the input ports of the third switching layer.

Although the configuration shown in FIGS. 6A and 6B assumes that an equal number of switching layers exist at each optical cross-connect at a network node and assume that each switching layer of each optical cross-connect has an equal number of input ports and of output ports, other configurations are possible. For example, in the case where the optical cross-connects have a different number of switching layers, the interconnections can be made initially as described above and the excess interconnections can be made thereby allowing multiple switching layers to be interconnected.

Similarly, in the case where each switching layer within an optical cross-connect has a different number of ports, the interconnections can be made initially as described in reference to FIGS. 6A and 6B above and the excess interconnections can made to the next switching layer. In other words, once the output ports of a relatively small-dimension switching layer are connected to the various transponder banks then the output ports for each remaining switching layer can be connected to the various transponder banks.

Analysis of Switching Layer Dimensions

By layering a switch fabric, the dimensions of the switching layers can be dramatically reduced to a manageable size for a high-capacity network. The dimension of a switching layer is defined as the number of input or output ports. In the following analysis, the non-layered, fully connected switch fabric (such as the known WIXC architecture) is used as the standard for comparison and demonstrating the reduction of switch size in the layered switch architectures. The dimension, Δ, of a non-layered fully connected switch fabric is the following:

$$\Delta = M \cdot X \cdot n + n_c \qquad (1)$$

where, M is the number of fiber trunks entering/exiting the switch fabric, X is the number of wavelengths used for transmission, n is the number of fiber pairs (including fibers for restoration) in each trunk, and $n_c$ is the number of local client fibers.

The number of switch points depends on different approaches for constructing the switch fabric. For example, the number of switch points equals $\Delta^2$ for crossbar matrix switches, and equals $^{\Delta}/_2 \cdot (\log_2 \Delta) \cdot (2 \log_2 \Delta - 1)$ for Cantor networks (strictly non-blocking Benes network, ignoring the cross point count for the multiplexers and demultiplexers).

For the single-stage layered switch architecture, the switch fabric is divided into N layers. Therefore, the dimension of each layer is reduced to $\Delta/n$. The number of switch points becomes $\Delta^2/N$ for cross-bar matrix switches, and $$\Delta/2 \cdot (\log_2 \Delta/N) \cdot (2\log_2 \Delta/N - 1)$$

for Cantor networks.

Figure 7:
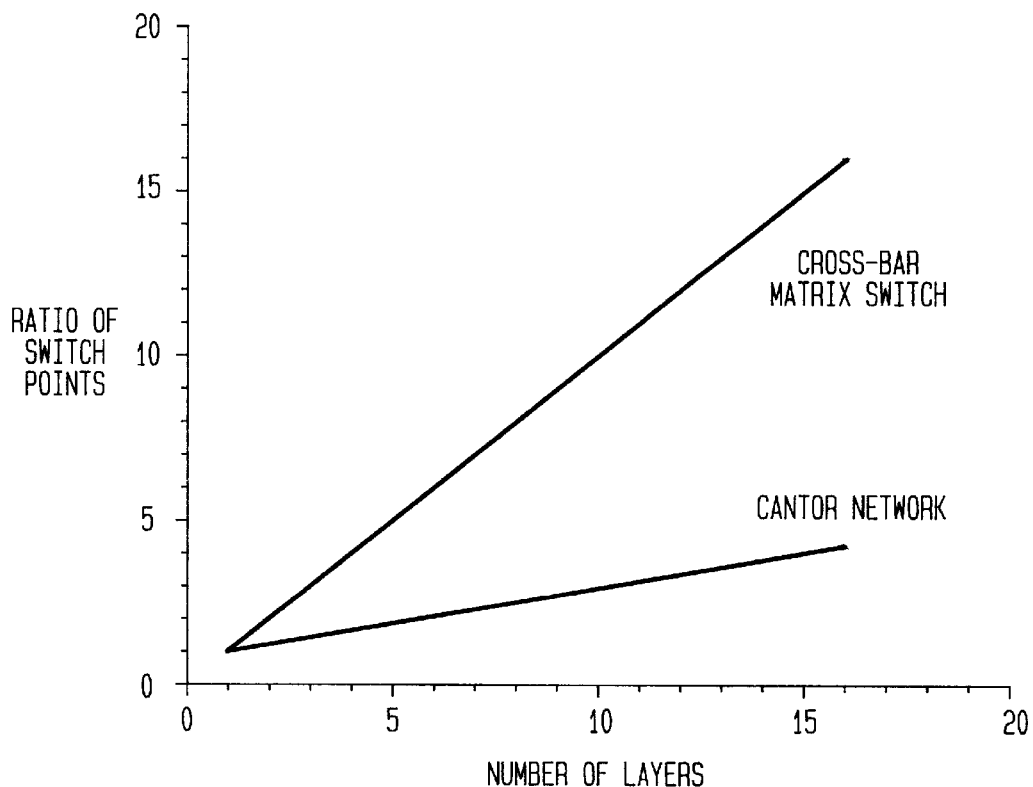
FIG. 7 shows ratio of the number of switch points in the non-layered switch fabric to that of the single-stage layered switch fabric versus the number of layers.

To illustrate the reduction in the number of switch points by layering the switch fabric, FIG. 7 shows the ratio of the number of switch points in fully connected switch fabric to that in a layered switch fabric versus the number of layers. The number of input/output ports $\Delta$ is assumed to be 256. The ratio increases as the number of switch layers increases, showing the merit of arbitrarily layering the switch fabric. The effect of layering the switch fabric is more dramatic for cross-bar matrix switches than for Cantor networks, because the number of switch points of Cantor networks increases logarithmically with the dimension of the switch layers. The layered switch architecture, however, has larger influence on loss and crosstalk in Cantor networks, as will be discussed below.

The blocking probability of the network traffic can be further reduced if two switches with orthogonal layering directions are cascaded in the same network node, as illustrated in FIG. 4. This also results in the uniformity of fiber interconnects in the network. In this architecture, the second switch does not have to include the inputs and outputs from the client interface. Therefore, the dimension of switch layers in the second switch becomes: $\Delta = M \cdot \lambda \cdot n$. The reduction in the number of switch points follows similar trend as the single-stage layered switch architecture. The ratio is nevertheless reduced, since both switch fabrics contribute to the switch points.

Analysis of Reduction in Loss and Crosstalk

In most switch fabrics, loss and cross-talk increase with the scale of the switch fabric. Therefore, by layering the switch fabric and thereby reducing the dimension of each switch layer, the loss and crosstalk of switch fabric should be reduced. Cross-bar matrix switches, used more often by free-space fiber-optic switches, are not considered below because the loss and crosstalk of cross-bar matrix switches have insignificant dependence on the scale of the switch layers. Most guided-wave photonics switches adopt Benes network (Cantor network) approaches and are discussed below regarding loss and crosstalk.

The loss and signal-to-crosstalk ratio (SXR) in rearrangeable non-blocking Benes networks are known. In a strictly non-blocking Cantor network, each input port and output port of the switching fabric are connected to the corresponding input port and output port of $\log_2 \Delta$ planes of Benes network though demultiplexers and multiplexers. The total optical loss through a Cantor network includes fiber/switch-fabric coupling loss, demultiplexer loss, and losses across the switch points. The total optical loss for a fully-connected, non-layered switch fabric is expressed as $$L_T^{NL} (dB) = 2L_F + L_D^{NL} + (2\log_2 \Delta - 1)L_S \quad (2)$$

where, $L_F$ is the fiber coupling loss, $L_D^{NL} = -10\log(\log_2 \Delta)$ is the demultiplexer loss (assuming only power splitting loss contributes), and $L_S$ is the loss through each switch point (assuming it is uniform across the switch fabric).

For the single-stage layered switch architecture, according to an embodiment of the present invention, the total optical loss in one layer becomes $$L_T^L (dB) = 2L_F + L_D^L + (2\log_2 \Delta/N - 1)L_S \quad (3)$$

where, $L_D^L$ is equal to $-10\log(\log_2 \Delta/N)$.

In a fully loaded Cantor network, the signal gathers crosstalk through every switch points along its path as well as crosstalk from other planes of Benes network through the multiplexer. Assuming uniform crosstalk through the switch fabric, the total first-order crosstalk power for non-layered switch fabrics is $$P_{out}^L = P_{in} x_c (2\log_2 \Delta - 1) + P_{in} x_c (\log_2 \Delta - 1) \quad (4)$$

where, $P_{in}$ is the input optical power, and $x_c$ is the power ratio of crosstalk at each switch point. The first term represents the crosstalk that the signal acquires through its path; the second term is the crosstalk from other planes of Benes network. The loss term is not considered because both signal and crosstalk paths experience the same loss and it will be canceled out in calculating SXR.

For the single-stage layered switch architecture, the total first-order crosstalk power is $$P_{out}^L = P_{in} x_c (1\log_2 \Delta/N - 1) + P_{in} x_c (\log_2 \Delta/N - 1) \quad (5)$$

The SXR for both non-layered and single-stage layered switch architecture can, therefore, be calculated using Eqs. (4) and (5):

$$SXR^{NL}(dB) = -10\log x_c - 10\log(3\log_2 \Delta - 2) \quad (6)$$

$$SXR^L(dB) = -10\log x_c - 10\log(3\log_2{}^{66}/N - 2) \quad (7)$$

Figure 8:
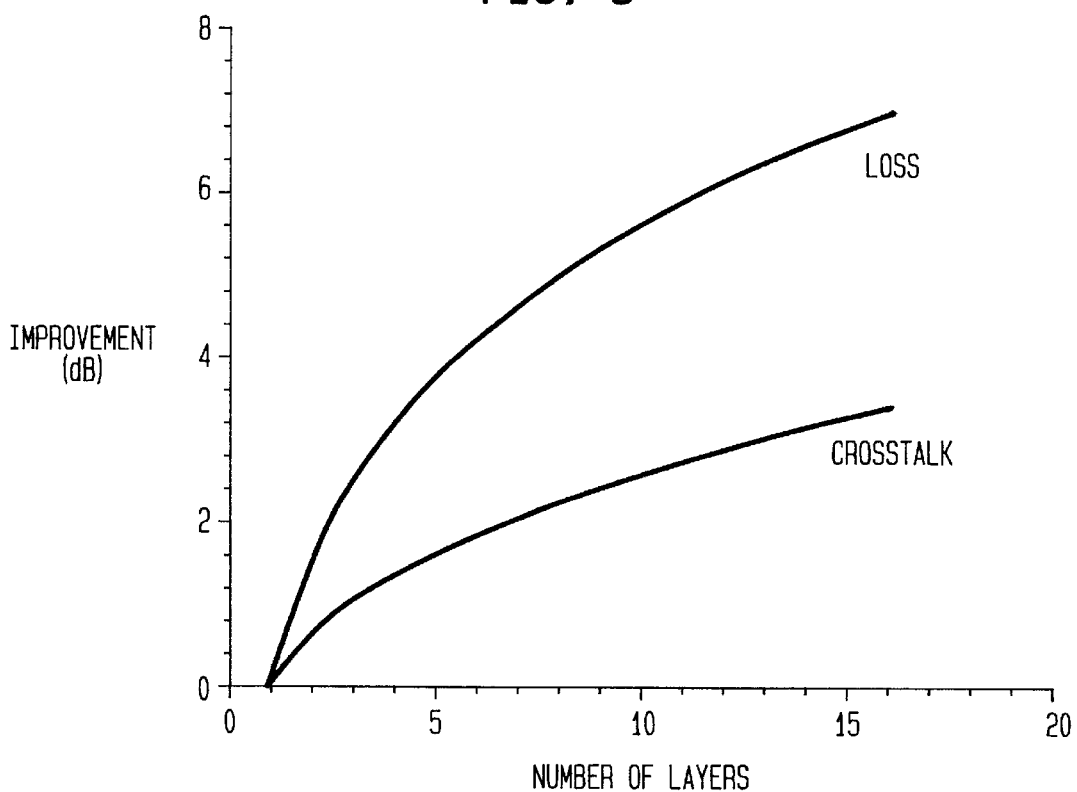
FIG. 8 shows improvement in loss and crosstalk by the layered switch architecture versus the number of layers, assuming the switch fabric is constructed using the Cantor network approach, according to an embodiment of the present invention.

FIG. 8 shows the improvement in loss and crosstalk of layered switch architecture over non-layered switch architecture using Cantor network approach. The values of $L_S$ and $\Delta$ are assumed to be $-0.5$ dB and 256, respectively. As FIG. 8 illustrates, the improvement in loss and crosstalk increases with the number of layers.

Figure 9:
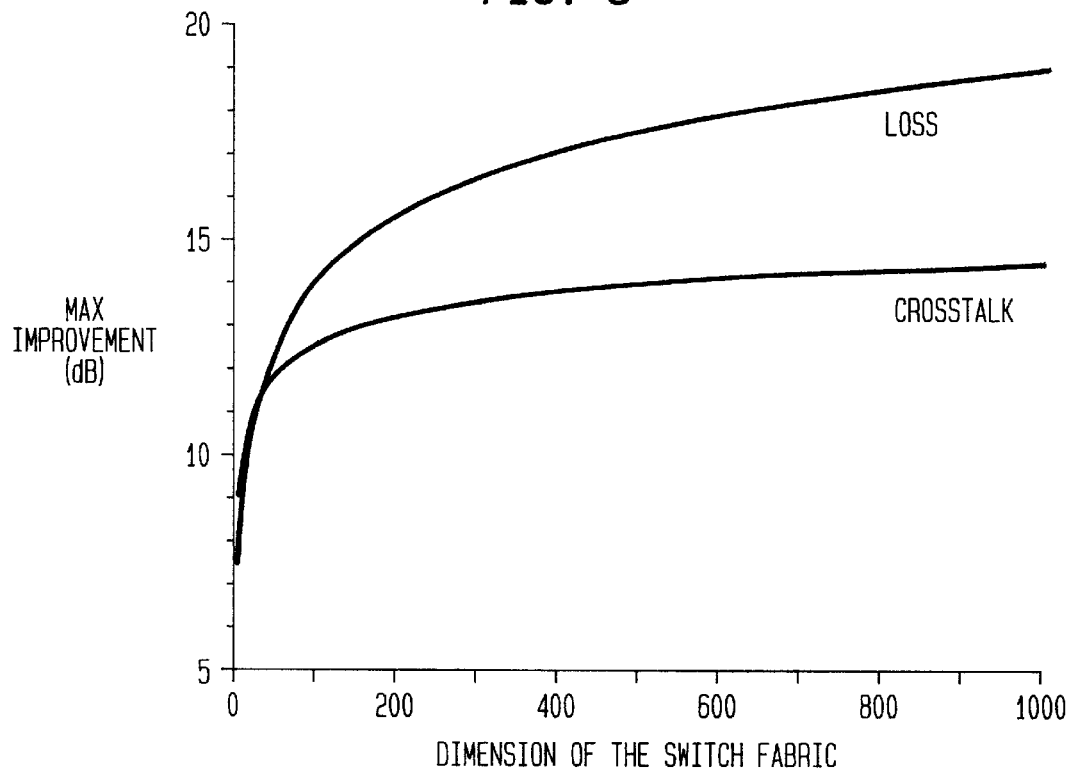
FIG. 9 displays the improvement in loss and crosstalk for the layered switch compared to the non-layered switch versus the number of switch layers N for the layered switch, according to an embodiment of the present invention.

FIG. 9 demonstrates the crosspoint reduction advantage of layered switch architectures using the Cantor network approach under network capacity expansion, according to an embodiment of the present invention. In FIG. 9, the layered switch fabric is assumed to have N number of switch layers each having a dimension of 8×8; the non-layered switch fabric is assumed to have a dimension of 8N×8N. FIG. 9 displays the improvement in loss and crosstalk for the layered switch compared to the non-layered switch versus the number of switch layers N for the layered switch. As FIG. 9 illustrates, the improvement in loss and crosstalk by the layered switch architectures increases with network capacity expansion. Consequently, for large-scale switch fabrics which are required in high-capacity optical transport networks, layering the switch fabric reduces the switch fabric loss and crosstalk as well as the switch size.

For the two-stage layered switch architecture, the analysis of loss and crosstalk follows similar algorithm. The cascaded effect from both stages, however, should be considered.

Analysis Of Blocking Probability

The blocking probability and the network utilization penalty are analyzed using the wavelength-based switch architecture (WSXC) and the fully-connected, non-layered switch architecture (WIXC) for comparison. Expandability with network growth will also be analyzed.

Fixed Number of Input/Output Ports

The blocking probability for an optical transport path with H hops and A input/output ports for each hop is analyzed. The single-stage layered switch architecture, according to an embodiment of the present invention, is analyzed first. Because each hop is not independent due to the orthogonal arrangement described above, the blocking probability for each hop depends on the number of layers a signal can access at each node, which is related to the blocking history of previous hops. The model for simulating the blocking probability for the transport path with H hops is described in the following: let $P_{h,k}$ is related to the blocking history of previous hops by $$P_{h,k} = C_k^N \sum_{i=1}^{N} (P_{h-1,i}(1-p^{Ai})^k (p^{Ai})^{N-k}), C_k^N = \frac{N!}{k!(N-k)!} \quad (8)$$

where, N is the number of layers in the switch fabric, $\rho$ is the link utilization (the probability that a wavelength is used on a fiber), and $A = \Delta/_N 2$ is the number of links connecting two layers in adjacent network nodes. The signal is blocked when there is no layer accessible at any hop along the transport path. The blocking probability for the single-stage switch architecture, according to an embodiment of the present invention, is therefore defined as $$P_b^{SS} = \sum_{h=1}^{H} P_{h,0} \quad (9)$$

By employing the initial condition $$P_{0,k} = \begin{cases} 1, & \text{if } k = N \\ 0, & \text{if } k \neq N \end{cases} \quad (10)$$

the blocking probability $P_b^{SS}$ can be obtained.

The algorithm for analyzing the blocking probability for the two-stage layered switch architecture, according to an embodiment of the present invention, is analogous to that for the single-stage architecture, with two differences. First, a signal on one layer has access to all the outputs on different layers, therefore, A·i in Eq.(8) is now replaced by $\Delta/_N$. Second, the effective link utilization $\rho_{eff,k}$ for the two-stage architecture needs to be modified—a link is not accessible if either it is utilized or it is not utilized but the cross-connect of the switch fabric is arranged such the signal cannot reach the unutilized link. If the signal can access k input layers, the effective utilization $\rho_{eff,k}$ is expressed as $$P_{eff,k} = \begin{cases} p, & \text{if } k = N \\ p + (1-p)\left(\left(\frac{m-A}{m}\right)^2\right)^k, & \text{if } k \neq N \end{cases} \quad (11)$$

where $m = \Delta/_N$ is the number of input/output ports for each layer, A is the number of paths through which the signal can access a particular output layer and has the same expression as previous definition. The blocking probability for the two-stage switch architecture $P_b^{TS}$ is now given by $$P_b^{TS} = \sum_{h=1}^{H} P_{h,0} \quad (12)$$

$$P_{h,k} = C_k^N \sum_{i=1}^{N} (P_{h-1,i}(1-(p_{eff,i})^m)^k ((p_{eff,i})^m)^{N-k}) \quad (13)$$

Figure 10:
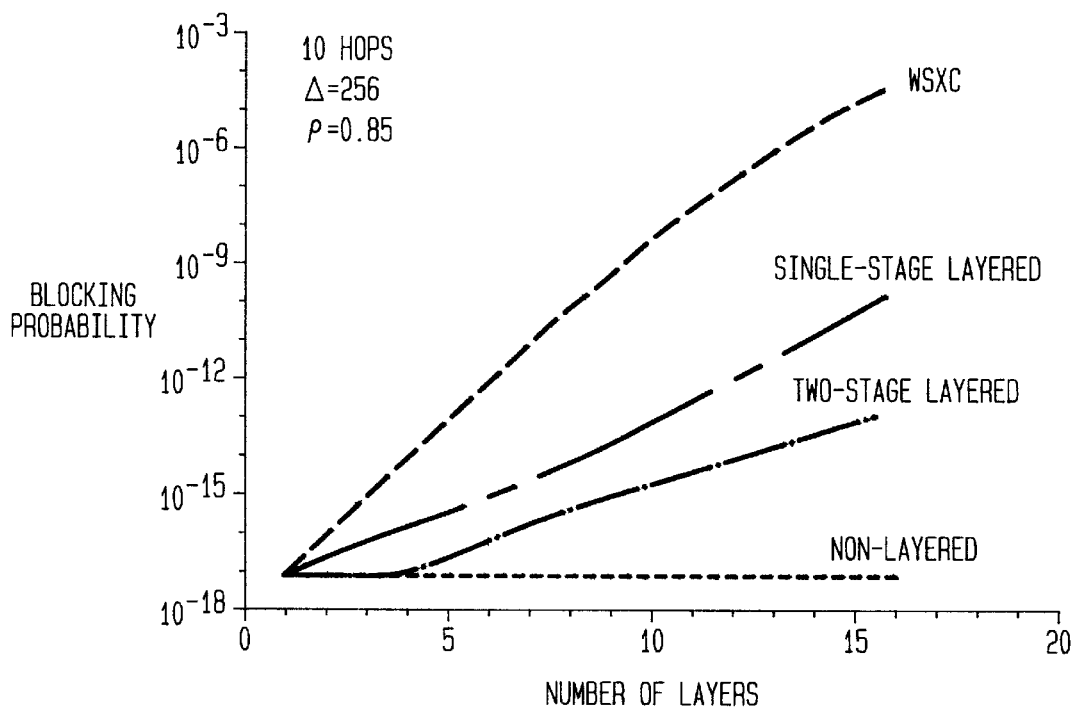
FIG. 10 shows blocking probability versus the number of layers for different switch architectures.

FIG. 10 shows the blocking probability versus the number of layers for the WSXC, a single-stage layered optical cross-connect according to an embodiment of the present invention, a two-stage layered optical cross-connect according to an embodiment of the present invention, and non-layered switch architecture (WIXC) along a transport path with 10 hops. The interference length in WSXC is not considered for the simulation, while $\Delta=256$ and $\rho=0.85$ is assumed in the calculation. For WSXC, the number of layers is equal to the number of wavelengths.

The communication between different wavelength/layers is prohibited in WSXC, therefore it has the highest blocking probability. Because of the wavelength-independence and the ability to communicate between layers, the single-stage layered switch architecture has substantially lower blocking probability than WSXC, while the advantage of switch-size reduction remains unchanged. With one more stage in each network node, the blocking probability performance of the two-stage architecture approaches that of the non-layered switch fabric. Three-stage architecture (Clos network) achieves the performance of the non-layered switch architecture.

Figure 11:
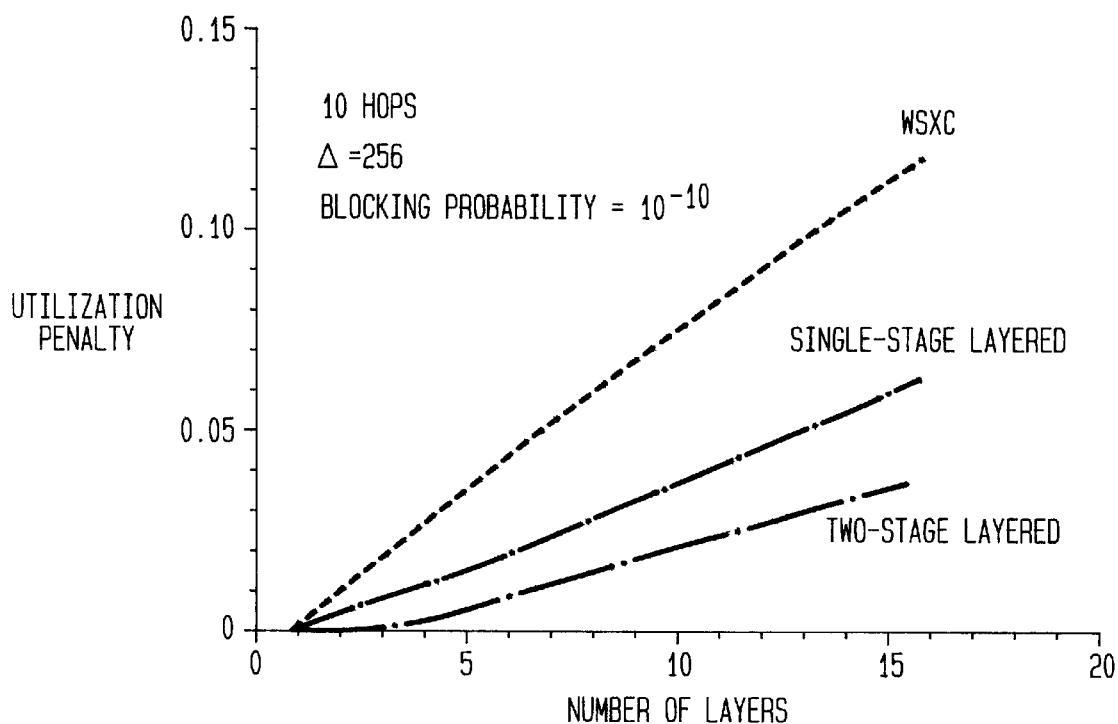
FIG. 11 shows utilization penalty (compared to the non-layered switch architecture) versus the number of layers for different switch architectures.

Utilization penalty indicates how much more network investment is required to reach a given level of performance for each switch architectures. Utilization penalty is defined as the percentage of extra unused links required to achieve a specific blocking probability when compared to the fully-connected, non-layered switch architecture. FIG. 11 shows the utilization penalty for different switch architectures assuming the blocking probability equals to $10^{-10}$. The layered architectures have much lower utilization penalties (<6.5%) compared to WSXC.

Growth with Network Capacity

To reduce the cost of upgrading network capacity, a switch architecture should be designed such that when there is expansion in network traffic, the switch fabric in each network node is also growable by using the current switch components or by adding additional switch components instead of requiring the replacement with new switch fabric. The non-layered switch architecture is not suitable if the network capacity expansion is achieved by increasing the number of wavelengths and/or fibers in the fiber trunk, because the number of its input/output ports is fixed. The WSXC architecture is modular when capacity is increased by adding wavelengths, but not when the number of fibers is increased. Therefore, the blocking probability for WSXC and for the single-stage and two-stage layered architectures are compared assuming the network capacity expansion is realized by increasing the number of wavelengths.

Figure 12:
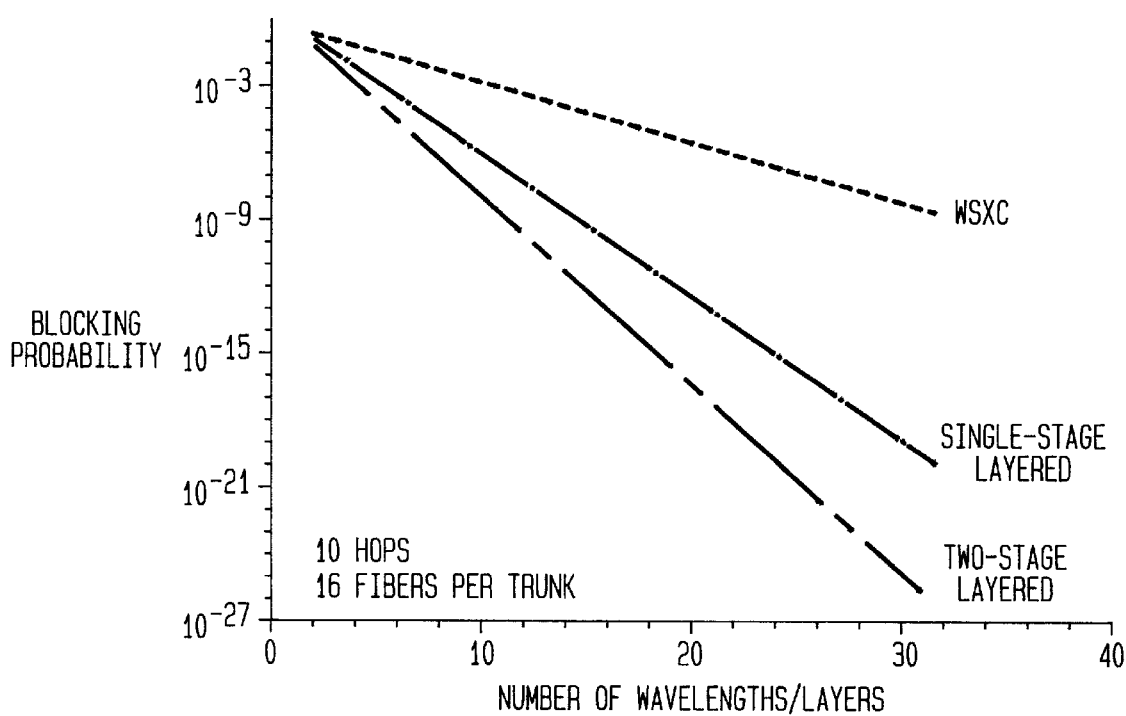
FIG. 12 shows blocking probability versus the number of wavelengths for different switch architectures assuming the number of input/output ports in each switch layer is 16.

FIG. 12 shows the blocking probability versus the number of wavelengths. The number of hops in the transport path is equal to 10; the number of fibers in each trunk is 16. The dimension of each layer is also chosen to be 16 so that the number of wavelengths is equal to the number of layers for all three architectures. As the number of wavelengths increases, the blocking probability decreases because more channels are available to the signal. Layered switch architectures according to an embodiment of the present invention have much lower blocking probability than the WSXC architecture as the number of wavelengths increases. Therefore, single-stage and two-stage layered switch architectures, according to embodiments of the present invention, are suitable for rapidly growing high-capacity optical fiber transport network.

It should, of course, be understood that while the present invention has been described in reference to particular system components and system processes, other system configurations and processes should be apparent to those of ordinary skill in the art. For example, the optical cross-connect can be used in a WDM communications system and a non-WDM communications system.

Similarly, the optical cross-connects with a communications network can each have different configurations. For example, a single-stage cross-connect can be interconnected with a two-stage cross-connect. An optical cross-connect with some number of switching layers can be interconnected with an optical cross-connect with a different switching layers; the number of output ports and input ports for each switching layer for either optical cross-connect can also vary.

What is claimed is:

1. An optical cross-connect for switching signals from a first plurality of optical fibers to a second plurality of optical fibers, comprising:

a plurality of switching layers, each switching layer having its own plurality of input ports coupled to at least a portion of the first plurality of optical fibers, each switching layer having its own plurality of output ports coupled to at least a portion of the second plurality of optical fibers, the input ports and the output ports of each switching layer being fully interconnected, and at least one switching layer from the plurality of switching layers being configured to switch at least two signals from the same optical fiber from the first plurality of optical fibers to the second plurality of optical fibers.

2. The optical cross-connect of claim 1, wherein the at least two signals include a first signal and a second signal, the first signal corresponding to a first wavelength-division multiplex (WDM) channel having a first wavelength, the second signal corresponding to a second WDM channel having a second wavelength.

3. The optical cross-connect of claim 1, wherein each switching layer from the plurality of switching layers has at least one monolithic switch element.

4. The optical cross-connect of claim 1, further comprising:

a plurality of wavelength demultiplexers, each wavelength demultiplexer being coupled to one optical fiber from the first plurality of optical fibers; and a plurality of regenerators, each regenerator being coupled to one wavelength demultiplexer and being coupled to a portion of the input ports of at least one switching layer from the plurality of switching layers, whereby said plurality of wavelength demultiplexers and said plurality of regenerators are interposed between said plurality of switching layers and the first plurality of optical fibers.

5. The optical cross-connect of claim 1, further comprising:

a plurality of wavelength multiplexers, each wavelength multiplexer being coupled to one optical fiber from the second plurality of optical fibers; and a plurality of regenerators, each regenerator being coupled to one wavelength multiplexer and being coupled to a portion of the output ports of at least one switching layer from the plurality of switching layers, whereby said plurality of wavelength demultiplexers and said plurality of regenerators are interposed between said plurality of switching layers and the second plurality of optical fibers.

6. The optical cross-connect of claim 1, further comprising:

a plurality of wavelength demultiplexers, each wavelength demultiplexer being coupled to one optical fiber from the first plurality of optical fibers; and a plurality of optical wavelength converters, each wavelength converter being coupled to one wavelength demultiplexer and being coupled to at least a portion of the input ports of at least one switching layer from the plurality of switching layers, whereby said plurality of wavelength demultiplexers and said plurality of optical wavelength converts are interposed between said plurality of switching layers and the first plurality of optical fibers.

7. The optical cross-connect of claim 1, further comprising:

a plurality of wavelength multiplexers, each wavelength multiplexer being coupled to one optical fiber from the second plurality of optical fibers; and a plurality of optical wavelength converters, each wavelength converter being coupled to one wavelength multiplexer and being coupled to at least a portion of the output ports of at least one switching layer from the plurality of switching layers, whereby said plurality of wavelength demultiplexers and said plurality of optical wavelength converters are interposed between said plurality of switching layers and the second plurality of optical fibers.

8. An optical cross-connect for switching signals from a first plurality of optical fibers to a second plurality of optical fibers, comprising:

a first plurality of switching layers, each switching layer having its own plurality of input ports coupled to at least a portion of the first plurality of optical fibers, the input ports and the output ports of each switching layer being fully interconnected, a second plurality of switching layers, each switching layer from the second plurality having its own plurality of input ports coupled to at least a portion of the output ports of the first plurality of switching layers, each switching layer from the second plurality having its own plurality of output ports coupled to at least a portion of the second plurality of optical fibers, the input ports and the output ports of each switching layer from the second plurality being fully interconnected, at least one switching layer from the first plurality of switching layers being configured to switch at least two signals from the same optical fiber from the first plurality of optical fibers to the second plurality of switching layers.

9. The optical cross-connect of claim 8, wherein at least one switching layer from the second plurality of switching layers is configured to switch at least two signals from the first plurality of switching layers to the second plurality of optical fibers.

10. The optical cross-connect of claim 8, wherein each switching layer from the first plurality of switching layers has at least one monolithic switch element.

11. The optical cross-connect of claim 8, wherein each switching layer from the second plurality of switching layers has at least one monolithic switch element.

12. An optical cross-connect switching signals from a first plurality of optical fibers to a second plurality of optical fibers, within a wavelength-division multiplexing (WDM) communications system, comprising:

a plurality of switching layers, each switching layer having its own plurality of input ports coupled to at least a portion of the first plurality of optical fibers, each switching layer having its own plurality of output ports coupled to at least a portion of the second plurality of optical fibers, the input ports and the output ports of each switching layer being fully interconnected, and at least one switching layer from the plurality of switching layers being configured to switch at least two signals having different wavelengths carried by the first plurality of optical fibers.

13. The optical cross-connect of claim 12, wherein each switching layer from the plurality of switching layers has at least one monolithic switch element.

14. The optical cross-connect of claim 12, further comprising:
- a plurality of wavelength demultiplexers, each wavelength demultiplexer being coupled to one optical fiber from the first plurality of optical fibers; and
- a plurality of regenerators, each regenerator being coupled to one wavelength demultiplexer and being coupled to a portion of the input ports of at least one switching layer from the plurality of switching layers,
- whereby said plurality of wavelength demultiplexers and said plurality of regenerators are interposed between said plurality of switching layers and the first plurality of optical fibers.

15. The optical cross-connect of claim 12, further comprising:
- a plurality of wavelength multiplexers, each wavelength multiplexer being coupled to one optical fiber from the second plurality of optical fibers; and
- a plurality of regenerators, each regenerator being coupled to one wavelength multiplexer and being coupled to a portion of the output ports of at least one switching layer from the plurality of switching layers,
- whereby said plurality of wavelength demultiplexers and said plurality of regenerators are interposed between said plurality of switching layers and the second plurality of optical fibers.

16. The optical cross-connect of claim 12, further comprising:
- a plurality of wavelength demultiplexers, each wavelength demultiplexer being coupled to one optical fiber from the first plurality of optical fibers; and
- a plurality of optical wavelength converters, each wavelength converter being coupled to one wavelength demultiplexer and being coupled to at least a portion of the input ports of at least one switching layer from the plurality of switching layers,
- whereby said plurality of wavelength demultiplexers and said plurality of optical wavelength converts are interposed between said plurality of switching layers and the first plurality of optical fibers.

17. The optical cross-connect of claim 12, further comprising:
- a plurality of wavelength multiplexers, each wavelength multiplexer being coupled to one optical fiber from the second plurality of optical fibers; and
- a plurality of optical wavelength converters, each wavelength converter being coupled to one wavelength multiplexer and being coupled to at least a portion of the output ports of at least one switching layer from the plurality of switching layers,
- whereby said plurality of wavelength demultiplexers and said plurality of optical wavelength converters are interposed between said plurality of switching layers and the second plurality of optical fibers.

18. An optical cross-connect switching signals from a first plurality of optical fibers to a second plurality of optical fibers, within a wavelength-division multiplexing (WDM) communications system, comprising:
- a first plurality of switching layers, each switching layer having its own plurality of input ports coupled to at least a portion of the first plurality of optical fibers, the input ports and the output ports of each switching layer being fully interconnected, and
- a second plurality of switching layers, each switching layer from the second plurality having its own plurality of input ports coupled to at least a portion of the output ports of the first plurality of switching layers, each switching layer having its own plurality of output ports coupled to at least a portion of the second plurality of optical fibers, the input ports and the output ports of each switching layer from the second plurality being fully interconnected,
- at least one switching layer from the first plurality of switching layers being configured to switch at least two signals having different wavelengths carried by the first plurality of optical fibers.

19. The optical cross-connect of claim 18, wherein at least one switching layer from the second plurality of switching layers is configured to switch at least two signals from the first plurality switching layers to the second plurality of optical fibers.

20. The optical cross-connect of claim 18, wherein each switching layer from the first plurality of switching layers has at least one monolithic switch element.

21. The optical cross-connect of claim 18, wherein each switching layer from the second plurality of switching layers has at least one monolithic switch element.

22. A communications network, comprising:
- a first non-fully-connected optical cross-connect having a first plurality of switching layers each having its own plurality of input ports and its own plurality of output ports; and
- a second non-fully-connected optical cross-connect having a second plurality switching layers each having its own plurality of input ports and its own plurality of output ports;
- a first output port of a first switching layer from the first plurality of switching layers being coupled to a first input port of a first switching layer from the second plurality of switching layers; and
- a second output port of the first switching layer from the first plurality of switching layers being coupled to a first input port of a second switching layer from the second plurality of switching layers.

23. An optical cross-connect, comprising:
- a plurality of switching layers, each switching layer having its own plurality of input ports coupled to an input transponder bank having a plurality of input transponders, each switching layer having its own plurality of output ports coupled to a output transponder bank having a plurality of output transponders,
- for an $i^{th}$ switching layer of the optical cross-connect, each output port being coupled to a $i^{th}$ output transponder from the output transponder banks; and
- for the $i^{th}$ switching layer of the optical cross-connect, each input port being coupled to the input transponders of an $i^{th}$ input transponder bank.

* * * * *